United States Patent [19]
Jennett et al.

[11] Patent Number: 5,470,446
[45] Date of Patent: Nov. 28, 1995

[54] PROCESS FOR THE PRODUCTION OF SILICON NITRIDE

[75] Inventors: Timothy A. Jennett; Patrick D. Harmsworth; Dave Martin; Anthony W. Ellison, all of Cleveland, England

[73] Assignee: Tioxide Specialties Limited, London, England

[21] Appl. No.: 217,053

[22] Filed: Mar. 24, 1994

[30] Foreign Application Priority Data

Apr. 1, 1993 [GB] United Kingdom ............... 9306802

[51] Int. Cl.⁶ .................................................. C01B 21/06
[52] U.S. Cl. ........................................................ 204/177
[58] Field of Search ................................... 204/177, 178

[56] References Cited

U.S. PATENT DOCUMENTS

| | | | |
|---|---|---|---|
| 2,952,599 | 9/1960 | Suchet | 204/177 |
| 3,345,134 | 10/1967 | Heymer et al. | 23/191 |
| 3,979,500 | 9/1976 | Sheppard et al. | 423/289 |
| 4,022,872 | 5/1977 | Carson et al. | 423/297 |
| 4,788,049 | 11/1988 | Long et al. | 423/344 |
| 5,002,646 | 3/1991 | Egerton et al. | 204/177 |
| 5,021,134 | 6/1991 | Blackburn et al. | 204/177 |

FOREIGN PATENT DOCUMENTS

| | | |
|---|---|---|
| 0063272 | 1/1985 | European Pat. Off. |
| 0219764 | 5/1991 | European Pat. Off. |
| 0492079 | 7/1992 | European Pat. Off. |
| 53-130300 | 11/1978 | Japan |
| 54-132500 | 10/1979 | Japan |
| 59-050007 | 3/1984 | Japan |
| 59-073412 | 4/1984 | Japan |
| 59-169911 | 9/1984 | Japan |
| 59-162110 | 9/1984 | Japan |
| 60-155509 | 8/1985 | Japan |
| 60-246212 | 12/1985 | Japan |
| 62-162610 | 7/1987 | Japan |
| 62-282636 | 12/1987 | Japan |
| 1083504 | 3/1989 | Japan |
| 1313308 | 12/1989 | Japan |
| 3141107 | 6/1991 | Japan |
| 1199811 | 2/1969 | United Kingdom |

OTHER PUBLICATIONS

CA117:176, 673, 1992.
Harmsworth, P. D., et al., "Gas Phase Production of Silicon Nitride Using a DC Plasma", Paper presented at the 4th International Symposium on Ceramic Materials & Components for Engines, Goteborg, Sweden, Jun. 1991.

*Primary Examiner*—John Niebling
*Assistant Examiner*—Kishor Mayekar
*Attorney, Agent, or Firm*—Maria Parrish Tungol

[57] ABSTRACT

A process for the production of substantially crystalline silicon nitride comprising heating a mixture of ammonia and a silicon halide by means of an electric plasma formed in a stream of a non-oxidizing gas is described. Energy is transferred to the stream of gas at a rate of at least 30 kilowatts per mole of silicon halide per minute and at least 25 kilowatts. In a preferred embodiment gaseous material is caused to recirculate within the reactor so that there is a recirculation ratio (RR) greater than 2.5 where RR is defined by $$RR = \frac{0.425 M_n \cdot R}{M \cdot R_n} \left[ \frac{D}{D_n} \right]^{1/2} - 0.425$$

wherein $M_n$=mass flow of gas stream through the inlet nozzle, R=internal radius of the reactor into which said gas stream flows, M=mass flow of gases in the reactor at a distance 4R downstream from the inlet nozzle, $R_n$=radius of inlet nozzle, $D_n$=density of gas stream passing through the inlet nozzle, D=density of gases in reactor at a distance 4R downstream from the inlet nozzle. The degree of crystallinity of the silicon nitride prepared according to this method is very high and typically greater than 85%

16 Claims, 1 Drawing Sheet

PROCESS FOR THE PRODUCTION OF SILICON NITRIDE

This invention relates to the production of silicon nitride and in particular to a process for the production of crystalline silicon nitride by means of a vapour phase reaction between silicon tetrachloride and ammonia.

DESCRIPTION OF THE INVENTION

A number of processes for the preparation of silicon nitride are known and the product may be either crystalline or amorphous. The crystalline form is preferred since this form has a higher resistance to hydrolysis, a higher density and is generally easier to handle.

Crystalline silicon nitride can be produced by, for example, nitridation of elemental silicon with nitrogen or ammonia but this product is generally coarse and needs to be milled to produce a fine material suitable for forming ceramics. The milling process is likely to introduce contaminants such as iron or tungsten. The gas phase reaction of silane, $SiH_4$, with ammonia can also produce crystalline silicon nitride but this is usually contaminated with elemental silicon and must therefore be purified. Vapour phase reaction of a silicon tetrahalide with ammonia produces silicon nitride having a small particle size but this is normally amorphous. Further processing is necessary to produce crystalline silicon nitride.

It is an object of the current invention to provide a process for the production of silicon nitride in which crystalline silicon nitride having a small particle size and high purity is produced in one step.

SUMMARY OF THE INVENTION

According to the invention a process for the production of substantially crystalline silicon nitride comprises heating a mixture of ammonia and a silicon halide by means of an electric plasma formed in a stream of a non-oxidising gas and generated by the discharge of direct current electricity between a pair of electrodes wherein the rate at which energy is transferred to the stream of gas is at least 30 kilowatts per mole of silicon halide per minute and at least 25 kilowatts.

The process produces in one step silicon nitride which is substantially crystalline and has a small particle size. The particle size can be assessed by measuring the BET specific surface area by nitrogen desorption and products of the process of the invention typically have a specific surface area greater than 20 meters squared per gram.

The crystallinity of the silicon nitride can be established by, for example, X-ray powder diffractometry but a particularly convenient method is the measurement of the density of material by pycnometry. In this specification the term "substantially crystalline silicon nitride" is used to describe silicon nitride having a density of at least 3.10 g cm$^{-3}$ when determined by pycnometry by means of a Micrometrics AccuPyc 1330 pycnometer using helium gas at 15°–30° C.

It is believed that silicon nitride having this density is composed of at least 85% by weight crystalline material. Preferably, however, for ease of handling and use, the crystalline silicon nitride has a density as determined by pycnometry of at least 3.14 g cm$^{-3}$ which is believed to correspond to a degree of crystallinity of about 95%.

The process of the invention can be carried out using any suitable apparatus which utilises a direct current discharge to generate a plasma in a stream of a non-oxidising gas but a particularly useful method for the operation of such an apparatus is described in UK Patent Application published as GB 2 232 662 which is incorporated herein by reference.

According to the method of GB 2 232 662 the gaseous material is caused to circulate within the reactor so that the recirculation ratio (RR) is greater than 2.5, said recirculation ratio being defined by the formula $$RR = \frac{0.425 \, M_n \cdot R}{M \cdot R_n} \left[ \frac{D}{D_n} \right]^{1/2} - 0.425$$

wherein $M_n$=mass flow of non oxidizing gas stream through an inlet nozzle

R=internal radius of the reactor into which said gas stream flows.

M=mass flow of gases in the reactor at a distance 4R downstream from the inlet nozzle $R_n$=radius of inlet nozzle $D_n$=density of gas stream passing through the inlet nozzle D=density of gases in reactor at a distance 4R downstream from the inlet nozzle.

Preferably the recirculation ratio is greater than 4.

When the reactor is not of constant internal radius then the formula may still be used as an approximation using a mean value of the radius R.

BRIEF DESCRIPTION OF THE DRAWINGS

A diagrammatic representation of the reactor used in this method is shown in FIG. 1.

In the drawing the reactor 1 is of cylindrical shape and has a constant internal radius (R) along its length. The heated gas stream is introduced via inlet 13 through a nozzle 2 of internal radius $R_n$. A number of inlets 4 are provided for the reactants. The drawing shows the point X at a distance of 4 reactor radii along the reactor from the inlet nozzle and a means 10 of separating the product which is discharged at point 14.

DETAILED DESCRIPTION OF THE INVENTION

Figure 1:
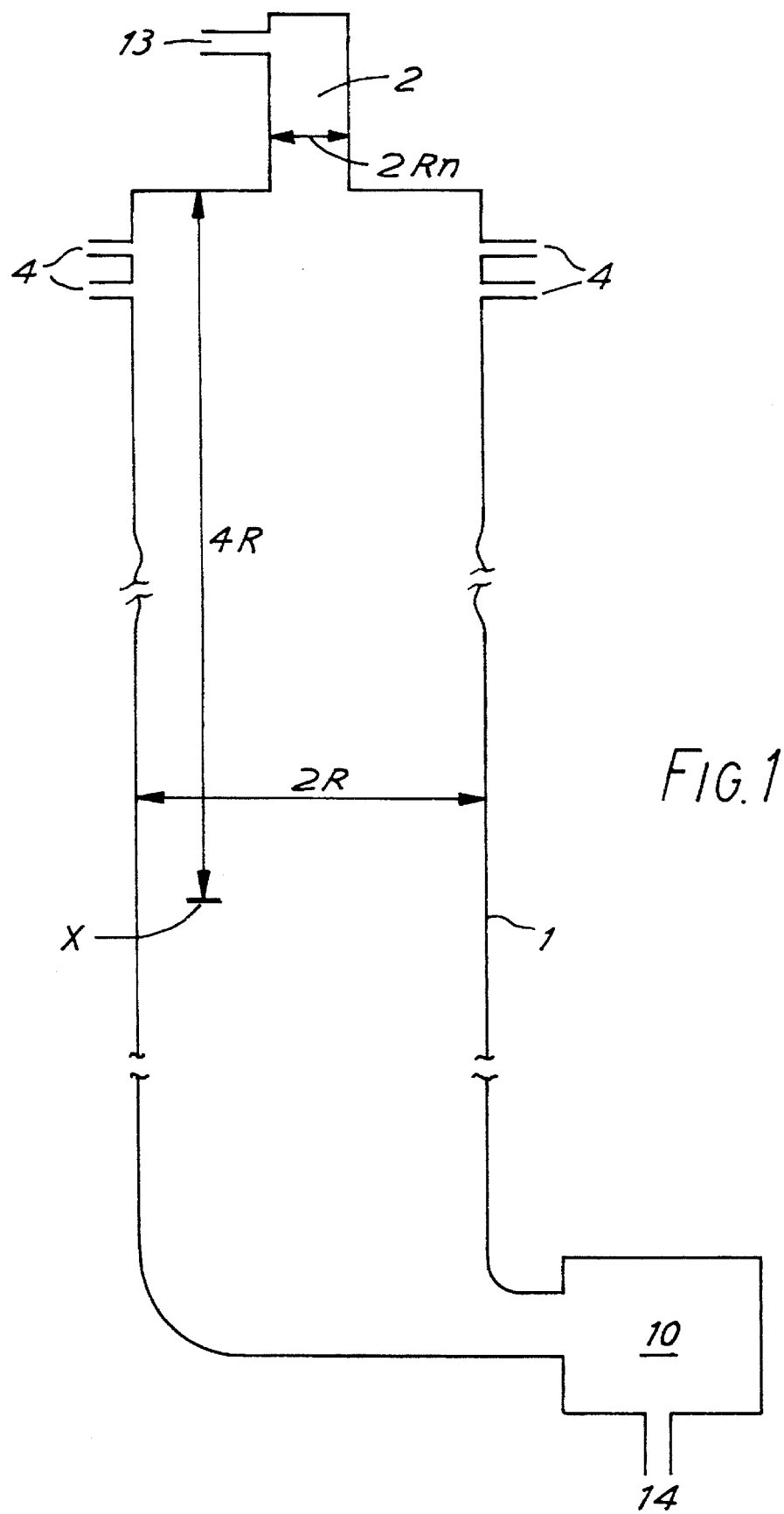

According to the process of the current invention the reactants (ammonia and silicon halide) are heated by a stream of a gas which is a non-oxidising gas such as argon, nitrogen or hydrogen. This gas is heated by passing between a pair of electrodes supplied with a direct electric current which is sufficient to transfer energy to the stream of gas at a rate of at least 25 kilowatts. Preferably the power is supplied at greater than or equal to 40 kilowatts.

According to the process the power supplied to the reactants is also related to the flow rate of the reactants through the reactor. The energy is transferred at a minimum rate of 30 kilowatts per mole of silicon halide being reacted per minute. Preferably the power supplied is at least 35 kilowatts per mole of silicon halide per minute.

A wide range of voltages and currents can be used depending on the nature of the apparatus used and the non-oxidising gas. Typically the voltage of the direct current will range from 300 to 500V and the current will range from 100 to 300 amps.

The reactants are ammonia and a halide of silicon. Useful halides include fluorides and chlorides such as silicon tetrafluoride and silicon tetrachloride.

Usually the concentration of the silicon halide in the total gas stream, of reactant and non-oxidizing gases without considering reaction or dissociation, is within the range 2 to 20 molar %, preferably 3 to 12 molar % and more preferably 4 to 10 molar % with respect to total gas stream.

The flow rate of reactants used will depend upon the design of the apparatus utilised since it is necessary to achieve the specified minimum power input per mole of silicon halide introduced per minute. However, substantially crystalline silicon nitride has been produced in an apparatus with a flow rate of from 0.5 to 5 mole per minute for silicon halide and from 1 to 15 mole per minute for ammonia.

The molar ratio of ammonia to silicon halide is usually maintained in the range 1.5:1 to 5.0:1 and preferably in the range 2.0:1 to 3.5:1.

After reaction the product of the process of the invention can be removed from the gas stream by any suitable separation technique either before or after cooling. Fabric filter cloth in the form of bag can be used as can a ceramic filter, pre-heated if necessary, or a cyclone. A scrubber supplied with a fluid can be used if desired and suitable fluids have been found to be water, aqueous ammonia or hydrochloric acid. The crystalline nature of the products of the process of the invention means that they are readily removed using a bag filter or a cyclone without significant losses due to the presence of very fine particulate material.

The products of the process of the invention are easily handled in commonly-used forming and processing operations, and are less dusty and less prone to hydrolysis than amorphous products having a similar average particle size. They are useful as raw ceramic powders either alone or in the formulation of composite materials such as cermets and mixed ceramics systems. Their high degree of crystallinity means that green ceramic bodies formed from them show better packing and less shrinkage on firing. Contact of the products with water does not cause a significant increase in their oxygen content and they are therefore easily processed using aqueous systems.

The chemical and thermal resistance of ceramics prepared from the products of the invention are such that they find use at high and low temperatures and in corrosive environments. They can be used to produce articles such as crucibles, evaporating vessels, pump seals, pump impellers and engine components such as turbine blades, valve seats and ball bearings.

The invention is illustrated by the following Examples

EXAMPLE 1

A DC plasma was established in nitrogen flowing at the rate of 24.4 mole/min through a pair of electrodes supplied with direct current at a power of 65 kW. An anode purge of nitrogen at a rate of 0.45 mole/min was also introduced into the gas stream. The gas stream was passed into a reactor and, when this reactor had stabilised in temperature, silicon tetrachloride at a rate of 1.57 mole/min and ammonia gas at a rate of 4.7 mole/min were fed into the area surrounding the tail flame of the plasma. The concentration of the silicon tetrachloride in the reaction mixture was 5.04 molar %.

The product was removed from the gas stream by passing the stream through a cyclone at a gas temperature of 700° C. and collecting particulate silicon nitride. The product had a surface area (BET) of 14 $m^2g^{-1}$, an oxygen content of 0.89% by weight and a density as measured by pycnometry of 3.2 g $cm^{-3}$.

The power used was equivalent to 41.4 kW per mole/min silicon tetrachloride.

EXAMPLE 2

A DC plasma was established in nitrogen flowing at the rate of 19.9 mole/min through a pair of electrodes supplied with direct current at a power of 65 kW. An anode purge of nitrogen at a rate of 0.6 moles/min was also introduced into the gas stream. The gas stream was passed into a reactor and when this reactor had stabilised in temperature silicon tetrachloride at a rate of 2.0 mole/min and ammonia gas at a rate of 10.5 mole/min were fed into the area surrounding the tail flame of the plasma. The concentration of the silicon tetrachloride in the reaction mixture was 6.06 molar %.

The product was removed from the gas stream by passing the stream through a cyclone at a gas temperature of 700° C. and collecting particulate silicon nitride. The product had a surface area (BET) of 23 $m^2g^{-1}$, an oxygen content of 0.8% by weight and a density as measured by pycnometry of 3.11 g $cm^{-3}$.

The power used was equivalent to 32.5 kW per mole/min silicon tetrachloride.

EXAMPLE A (Comparative)

A DC plasma was established in nitrogen flowing at the rate of 29 mole/min through a pair of electrodes supplied with direct current at a power of 77 kW. An anode purge of nitrogen at a rate of 3.8 mole/min was also introduced into the gas stream. The gas stream was passed into a reactor, and when this reactor had stabilised in temperature, silicon tetrachloride at a rate of 3.6 mole/min and ammonia gas at a rate of 17 mole/min were fed into the area surrounding the tail flame of the plasma. The concentration of the silicon tetrachloride in the reaction mixture was 6.7 molar %.

The product was removed from the gas stream by passing the stream through a cyclone at a gas temperature of 700° C. and collecting particulate silicon nitride. The product had a surface area (BET) of 24 $m^2g^{-1}$, an oxygen content of 2.2% by weight and a density as measured by pycnometry of 2.84 g $cm^{-3}$.

The power used was equivalent to 21.4 kW per mole/min silicon tetrachloride.

We claim:

1. A process for the production of substantially crystalline silicon nitride comprising generating an electric plasma by the discharge of direct current electricity between a pair of electrodes in a stream of a non-oxidizing gas, introducing said plasma into a reactor and mixing said plasma with a mixture of ammonia and a silicon halide, thereby heating said mixture of ammonia and a silicon halide and producing substantially crystalline silicon nitride having a density as determined by pycnometry greater than 3.10 g $cm^{-3}$ wherein said electricity is sufficient to transfer energy to said non-oxidizing gas at a rate of at least 30 kilowatts per mole of silicon halide per minute and at least 25 kilowatts.

2. A process according to claim 1 in which energy is transferred to the stream of gas at a rate of at least 40 kilowatts.

3. A process according to claim 1 in which energy is transferred to the stream of gas at a rate of at least 35 kilowatts per mole of silicon halide per minute.

4. A process according to claim 1 in which the direct current is supplied at a voltage in the range 300 to 500 volts.

5. A process according to claim 1 in which the direct current is in the range 100 to 300 amps.

6. A process according to claim 1 in which silicon halide in the gas stream has a concentration without considering reaction or dissociation within the range 2 to 20 molar per cent with respect to total gas stream.

7. A process according to claim 1 in which the ammonia and silicon halide are present in a molar ratio in the range 1.5:1 to 5.0:1 ammonia to silicon halide.

8. A process according to claim 1 further comprising the step of removing the silicon nitride from the gas stream by a separation means selected from the group consisting of a fabric filter cloth, a ceramic filter, a cyclone and a scrubber supplied with a fluid.

9. A process for the production of substantially crystalline silicon nitride comprising generating an electric plasma by the discharge of direct current electricity between a pair of electrodes in a stream of non-oxidizing gas, introducing said plasma through an inlet nozzle into a reactor and mixing said plasma with a mixture of ammonia and a silicone halide, thereby heating said mixture of ammonia and silicon halide and forming substantially crystalline silicon nitride having a density as determined by pycnometry greater than 3.10 g cm$^{-3}$ and collecting said silicon nitride, wherein said electricity is sufficient to transfer energy to said non-oxidizing gas at a rate of at least 30 kilowatts per mole of silicon halide per minute and at least 25 kilowatts and wherein said reactor is constructed and operated to induce circulation of gaseous material within the reactor such that a recirculation ratio (RR) is defined by the formula $$RR = \frac{0.425 \, M_n \cdot R}{M \cdot R_n} \left[ \frac{D}{D_n} \right]^{1/2} - 0.425$$

wherein $M_n$=mass flow of gas stream through the inlet nozzle, $R$=internal radius of the reactor into which said gas stream flows, $M$=mass flow of gases in the reactor at a distance 4R downstream from the inlet nozzle, $R_n$=radius of inlet nozzle $D_n$=density of gas stream passing through the inlet nozzle, $D$=density of gases in reactor at a distance 4R downstream from the inlet nozzle and the recirculation ratio is greater than 2.5.

10. A process according to claim 9 in which energy is transferred to the stream of gas at a rate of at least 40 kilowatts.

11. A process according to claim 9 in which energy is transferred to the stream of gas at a rate of at least 35 kilowatts per mole of silicon halide per minute.

12. A process according to claim 9 in which the direct current is supplied at a voltage in the range 300 to 500 volts.

13. A process according to claim 9 in which the direct current is in the range 100 to 300 amps.

14. A process according to claim 9 in which silicon halide in the gas stream has a concentration without considering reaction or dissociation within the range 2 to 20 molar per cent with respect to total gas stream.

15. A process according to claim 9 in which the ammonia and silicon halide are present in a molar ratio in the range 1.5:1 to 5.0:1 ammonia to silicon halide.

16. A process according to claim 9 further comprising the step of removing the silicon nitride from the gas stream by a separation means selected from the group consisting of a fabric filter cloth, a ceramic filter, a cyclone and a scrubber supplied with a fluid.

* * * * *